(12) United States Patent
Biskeborn et al.

(10) Patent No.: US 10,957,347 B1
(45) Date of Patent: Mar. 23, 2021

(54) THIN FILM HEATING DEVICE IN A WRITE GAP

(71) Applicant: International Business Machines Corporation, Armonk, NY (US)

(72) Inventors: Robert Biskeborn, Hollister, CA (US); Hugo E. Rothuizen, Oberrieden (CH); David Seagle, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/740,137

(22) Filed: Jan. 10, 2020

(51) Int. Cl.
| | | |
|---|---|---|
| *G11B 5/31* | (2006.01) | |
| *G11B 5/187* | (2006.01) | |
| *G11B 15/18* | (2006.01) | |
| *G11B 5/008* | (2006.01) | |
| *G11B 5/00* | (2006.01) | |

(52) U.S. Cl.
CPC .......... *G11B 5/314* (2013.01); *G11B 5/00813* (2013.01); *G11B 5/187* (2013.01); *G11B 15/18* (2013.01); *G11B 2005/0018* (2013.01); *G11B 2005/0021* (2013.01)

(58) Field of Classification Search
None
See application file for complete search history.

(56) References Cited

U.S. PATENT DOCUMENTS

| | | | | | |
|---|---|---|---|---|---|
| 4,130,847 | A | * | 12/1978 | Head | G11B 5/1871 360/122 |
| 4,520,409 | A | * | 5/1985 | Kimoto | B41J 2/43 346/74.5 |
| 6,493,183 | B1 | * | 12/2002 | Kasiraj | G11B 5/127 360/125.44 |
| 6,671,127 | B2 | * | 12/2003 | Hsu | G11B 5/127 360/123.14 |

(Continued)

FOREIGN PATENT DOCUMENTS

| | | | |
|---|---|---|---|
| EP | 0874355 A2 | | 10/1998 |
| JP | 61059604 A | * | 3/1986 |
| JP | 2006012256 A | * | 1/2006 |

OTHER PUBLICATIONS

Sebastian et al., "Dynamics of Integrated Silicon Micro-heaters," Proceedings of the 17th World Congress The International Federation of Automatic Control, Jul. 6-11, 2008, pp. 10474-10479.

(Continued)

*Primary Examiner* — William J Klimowicz
(74) *Attorney, Agent, or Firm* — Zilka-Kotab, P.C.

(57) ABSTRACT

An apparatus, in accordance with one embodiment, includes a write transducer having a pair of writer poles having pole tips, the pole tips defining a write gap therebetween. A thin film device is positioned at least in part in the write gap for raising a local temperature of the write gap. Electrical connections for causing a current to pass through the thin film device are also present. A method, in accordance with one embodiment, includes passing a current through a thin (Continued)

film device positioned at least in part in a write gap defined between pole tips of writer poles of a write transducer for causing heating of the thin film device. A level of the current is changed in response to detection of a predefined condition.

17 Claims, 13 Drawing Sheets

(56) References Cited

U.S. PATENT DOCUMENTS

| | | | | |
|---|---|---|---|---|
| 6,940,691 | B2* | 9/2005 | Maat | B82Y 10/00 360/125.31 |
| 6,975,472 | B2 | 12/2005 | Stover et al. | |
| 7,099,096 | B2* | 8/2006 | Ueyanagi | B82Y 10/00 360/59 |
| 7,133,254 | B2* | 11/2006 | Hamann | G11B 5/10 360/125.74 |
| 7,164,555 | B2 | 1/2007 | Kato et al. | |
| 7,729,087 | B1* | 6/2010 | Stoev | G11B 5/6005 360/125.74 |
| 7,952,827 | B2* | 5/2011 | Ohta | G11B 5/1278 360/125.02 |
| 7,961,429 | B2 | 6/2011 | Kurihara et al. | |
| 8,004,794 | B2* | 8/2011 | Zhou | G11B 5/1278 360/125.12 |
| 8,094,418 | B2* | 1/2012 | Schreck | B82Y 10/00 360/125.31 |
| 8,199,429 | B2* | 6/2012 | Yuasa | G11B 5/02 360/125.03 |
| 8,508,887 | B2 | 8/2013 | Wallash | |
| 8,526,139 | B2* | 9/2013 | Miyake | G11B 5/3136 360/125.31 |
| 8,842,387 | B1* | 9/2014 | Horide | G11B 5/235 360/110 |
| 8,922,949 | B1* | 12/2014 | Koui | G11B 5/235 360/125.3 |
| 9,013,820 | B1 | 4/2015 | Camalig et al. | |
| 9,165,584 | B2 | 10/2015 | Sytine et al. | |
| 9,858,952 | B1* | 1/2018 | Sato | G11B 5/314 |
| 9,916,848 | B2 | 3/2018 | Iben et al. | |
| 10,360,935 | B1* | 7/2019 | Liu | G11B 5/3166 |
| 2001/0000022 | A1* | 3/2001 | Shiroishi | B82Y 25/00 360/324 |
| 2004/0218302 | A1* | 11/2004 | Maat | G11B 5/58 360/59 |
| 2004/0228022 | A1* | 11/2004 | Ueyanagi | B82Y 25/00 360/59 |
| 2005/0190479 | A1* | 9/2005 | Terris | G11B 5/314 360/59 |
| 2008/0024896 | A1* | 1/2008 | Ohta | G11B 5/1278 360/59 |
| 2008/0239542 | A1* | 10/2008 | Yuasa | G11B 5/02 360/59 |
| 2009/0103208 | A1* | 4/2009 | Aoki | G11B 5/3133 360/110 |
| 2012/0126905 | A1* | 5/2012 | Zhang | G11C 11/1675 331/94.1 |
| 2012/0314325 | A1* | 12/2012 | Wessel | G11B 5/312 360/125.01 |
| 2013/0170060 | A1* | 7/2013 | Johns | G11B 5/3133 360/31 |
| 2019/0333531 | A1* | 10/2019 | Liu | G11B 5/6082 |

OTHER PUBLICATIONS

Biskeborn et al., U.S. Appl. No. 16/164,674, filed Oct. 18, 2018.

* cited by examiner

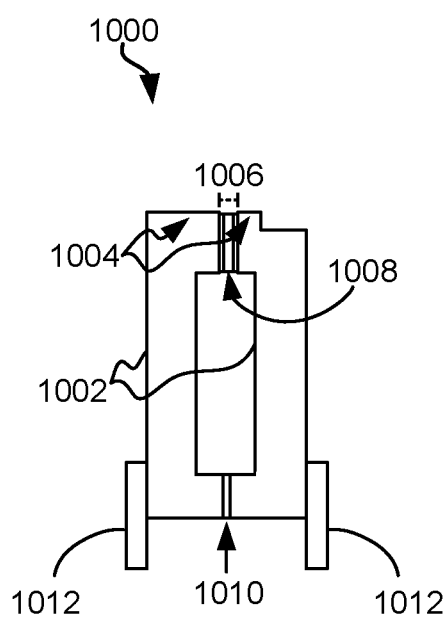
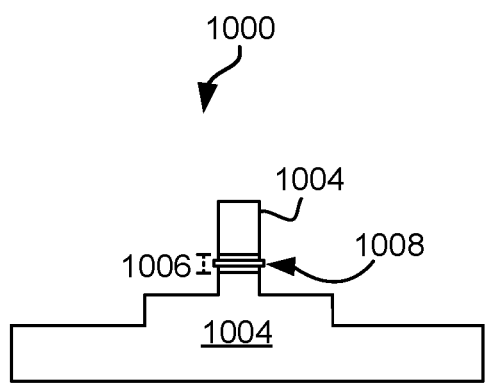
FIG. 10A
FIG. 10B

US 10,957,347 B1

THIN FILM HEATING DEVICE IN A WRITE GAP

BACKGROUND

The present invention relates to data storage systems, and more particularly, this invention relates to a thin film device proximate to recording gap of write transducer for multi-channel tape recording head.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

SUMMARY

An apparatus, in accordance with one embodiment, includes a write transducer having a pair of writer poles having pole tips, the pole tips defining a write gap therebetween. A thin film device is positioned at least in part in the write gap for raising a local temperature of the write gap. Electrical connections for causing a current to pass through the thin film device are also present.

A method, in accordance with one embodiment, includes passing a current through a thin film device positioned at least in part in a write gap defined between pole tips of writer poles of a write transducer for causing heating of the thin film device. A level of the current is changed in response to detection of a predefined condition.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 10A is a side view of a write transducer having a thin film device positioned at least in part in the write gap, in accordance with one embodiment.

FIG. 10B is a partial tape bearing surface view of the write transducer of FIG. 10A.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, an apparatus includes a write transducer having a pair of writer poles having pole tips, the pole tips defining a write gap therebetween. A thin film device is positioned at least in part in the write gap for raising a local temperature of the write gap. Electrical connections for causing a current to pass through the thin film device are also present.

In one general embodiment, a method includes passing a current through a thin film device positioned at least in part in a write gap defined between pole tips of writer poles of a write transducer for causing heating of the thin film device. A level of the current is changed in response to detection of a predefined condition.

Figure 1A:
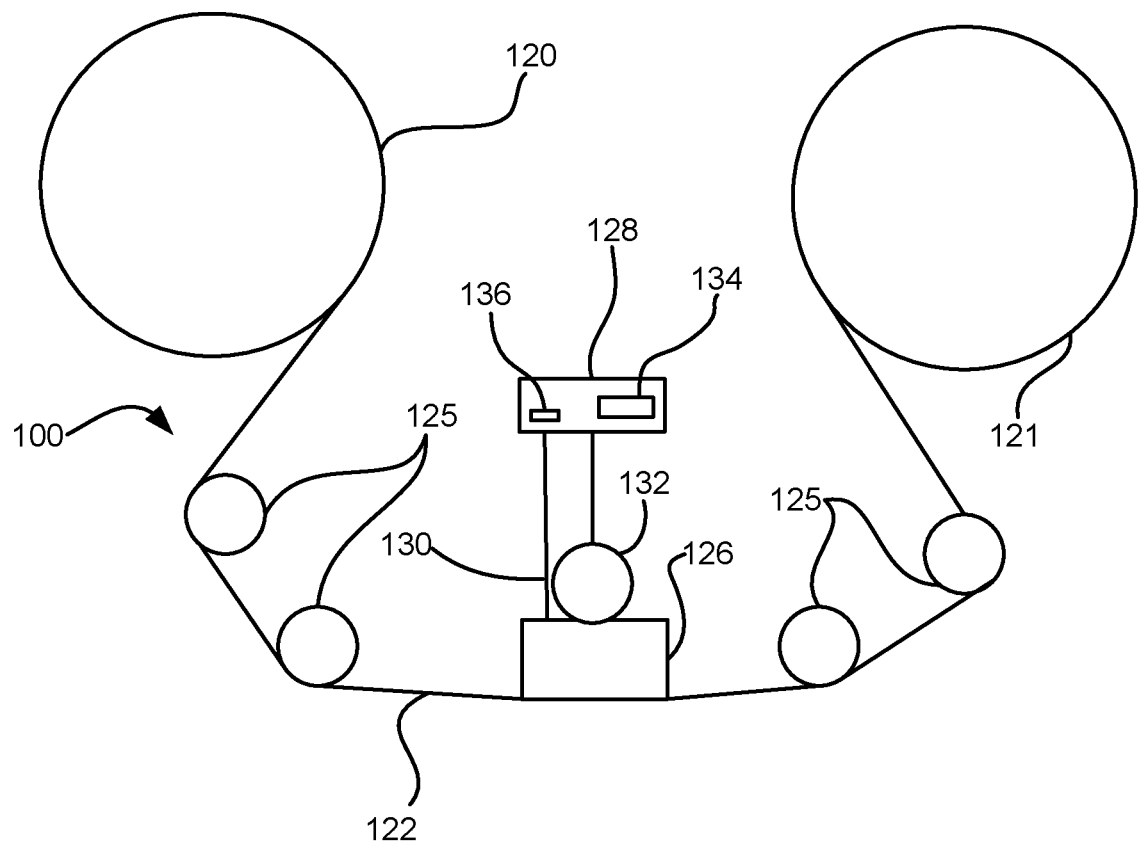
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the tape drive 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, write transducers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the tape head 126 to be recorded on the tape 122 and to receive data read by the tape head 126 from the tape 122. An actuator 132 controls position of the tape head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
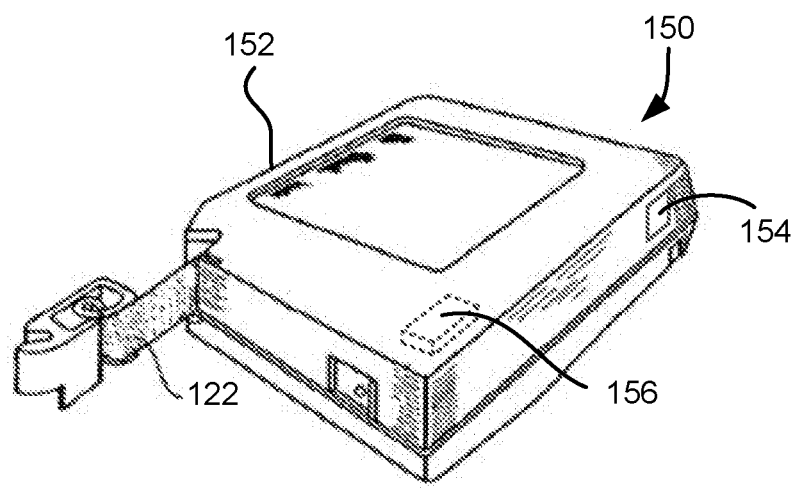
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, read-only memory (ROM) device, etc., embedded into or coupled to the inside or outside of the tape cartridge 150. The nonvolatile memory is accessible by the tape drive and the tape operating software (the driver software), and/or another device.

Figure 2A:
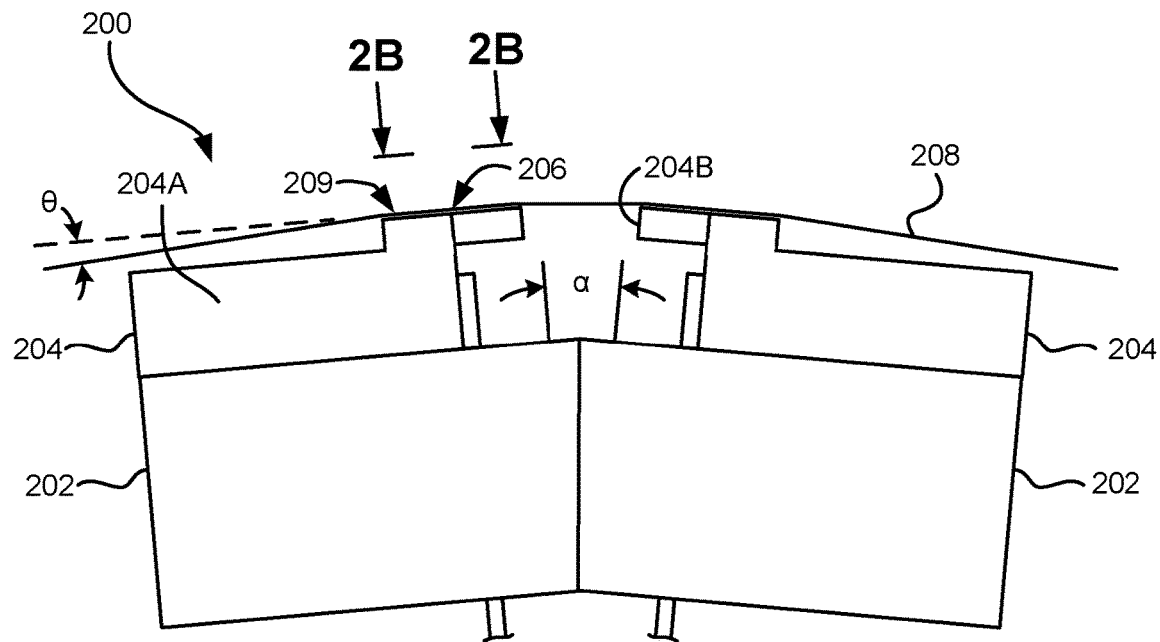
FIG. 2A illustrates a side view of a flat-lapped, bi-directional, two-module magnetic tape head according to one embodiment.

By way of example, FIG. 2A illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or write transducers 206 are formed. In use, a tape 208 is moved over the modules 204 along a media (tape) bearing surface 209 in the manner shown for reading and writing data on the tape 208 using the readers and write transducers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and write transducers may be arranged in a piggyback or merged configuration. An illustrative piggybacked configuration comprises a (magnetically inductive) write transducer on top of (or below) a (magnetically shielded) reader transducer (e.g., a magnetoresistive reader, etc.), wherein the poles of the write transducer and the shields of the reader are generally separated. An illustrative merged configuration comprises one reader shield in the same physical layer as one writer pole (hence, "merged"). The readers and write transducers may also be arranged in an interleaved configuration. Alternatively, each array of channels may be readers or write transducers only. Any of these arrays may contain one or more servo track readers for reading servo data on the medium.

Figure 2B:
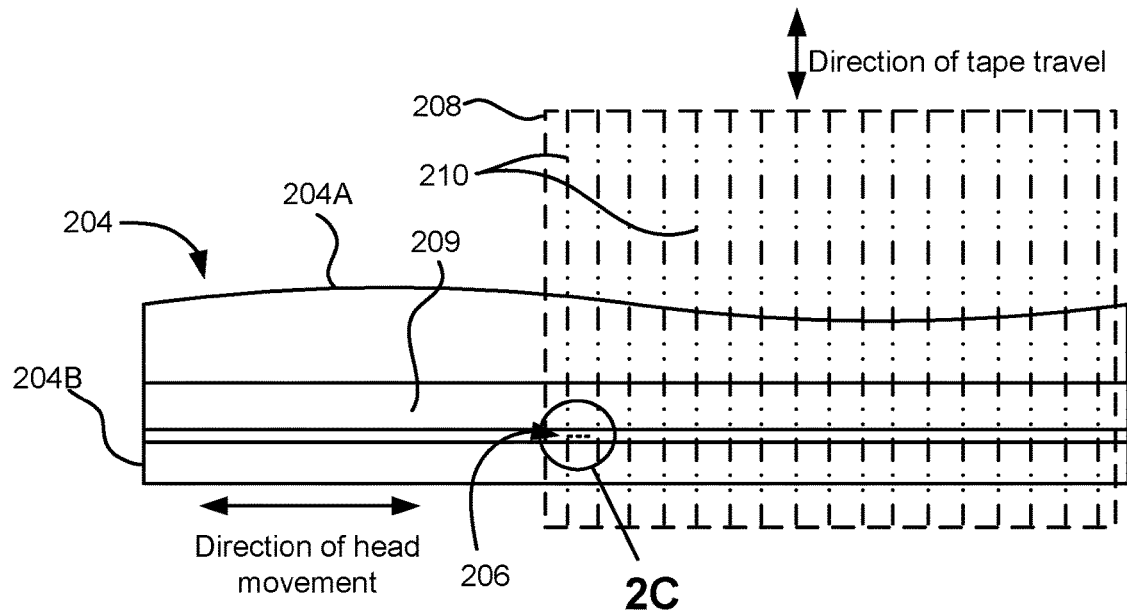
FIG. 2B is a tape bearing surface view taken from Line 2B of FIG. 2A.

FIG. 2B illustrates the tape bearing surface 209 of one of the modules 204 taken from Line 2B of FIG. 2A. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2B on a one-half inch wide tape 208. The data bands are defined between servo tracks 210. Each data band may include a number of data tracks, for example 1024 data tracks (not shown). During read/write operations, the readers and/or write transducers 206 are positioned to specific track positions within one of the data bands. Outer readers, sometimes called servo readers, read the servo tracks 210. The servo signals are in turn used to keep the readers and/or write transducers 206 aligned with a particular set of tracks during the read/write operations.

Figure 2C:
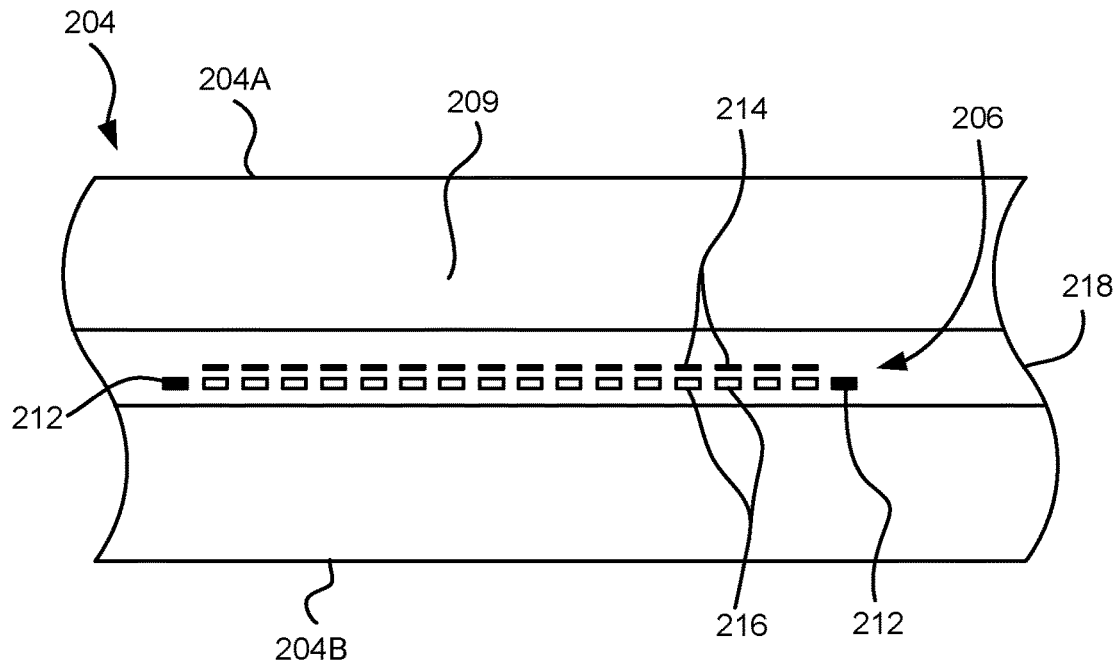
FIG. 2C is a detailed view taken from Circle 2C of FIG. 2B.

FIG. 2C depicts a plurality of readers and/or write transducers 206 formed in a gap 218 on the module 204 in Circle 2C of FIG. 2B. As shown, the array of readers and write transducers 206 includes, for example, 16 write transducers 214, 16 readers 216 and two servo readers 212, though the number of elements may vary. Illustrative embodiments include 8, 16, 32, 40, and 64 active readers and/or write transducers 206 per array, and alternatively interleaved designs having odd numbers of reader or write transducers such as 17, 25, 33, etc. An illustrative embodiment includes 32 readers per array and/or 32 write transducers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and write transducers may be arranged in a piggyback configuration as shown in FIG. 2C, the readers 216 and write transducers 214 may also be arranged in an interleaved configuration. Alternatively, each array of readers and/or write transducers 206 may be readers or write transducers only, and the arrays may contain one or more servo readers 212. As noted by considering FIGS. 2A and 2B-2C together, each module 204 may include a complementary set of readers and/or write transducers 206 for such things as bi-directional reading and writing, read-while-write capability, backward compatibility, etc.

Figure 2D:
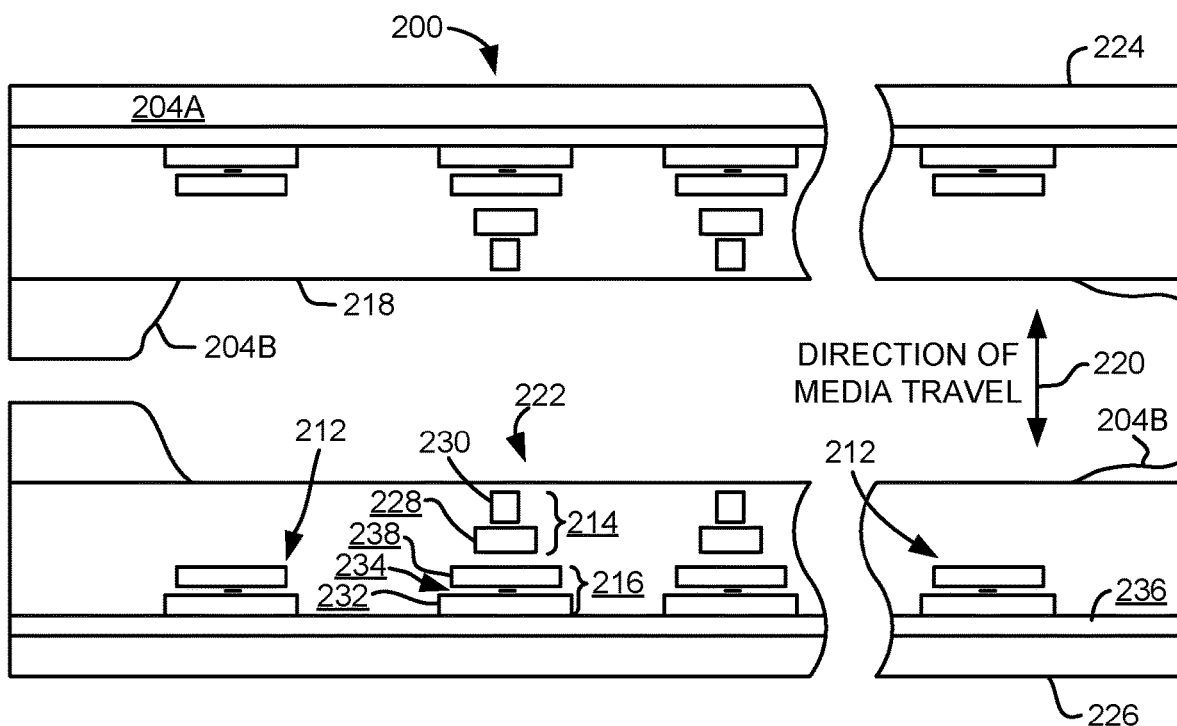
FIG. 2D is a detailed view of a partial tape bearing surface of a pair of modules.

FIG. 2D shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative insulating layer 236. The write transducers 214 and the readers 216 are aligned parallel to an intended direction of travel of a tape medium thereacross to form an R/W pair, exemplified by R/W pairs 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The head assembly 200 includes two thin-film modules 224 and 226 of generally identical construction.

Modules 224 and 226 are joined together with a space present between closures 204B thereof (partially shown) to form a single physical unit to provide read-while-write capability by activating the write transducer of the leading module and reader of the trailing module aligned with the write transducer of the leading module parallel to the direction of tape travel relative thereto. When a module 224, 226 of a magnetic tape head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (-), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer poles 228, 230, and a coil (not shown). The sensor may be of any known type, including those based on magnetoresistive (MR), GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
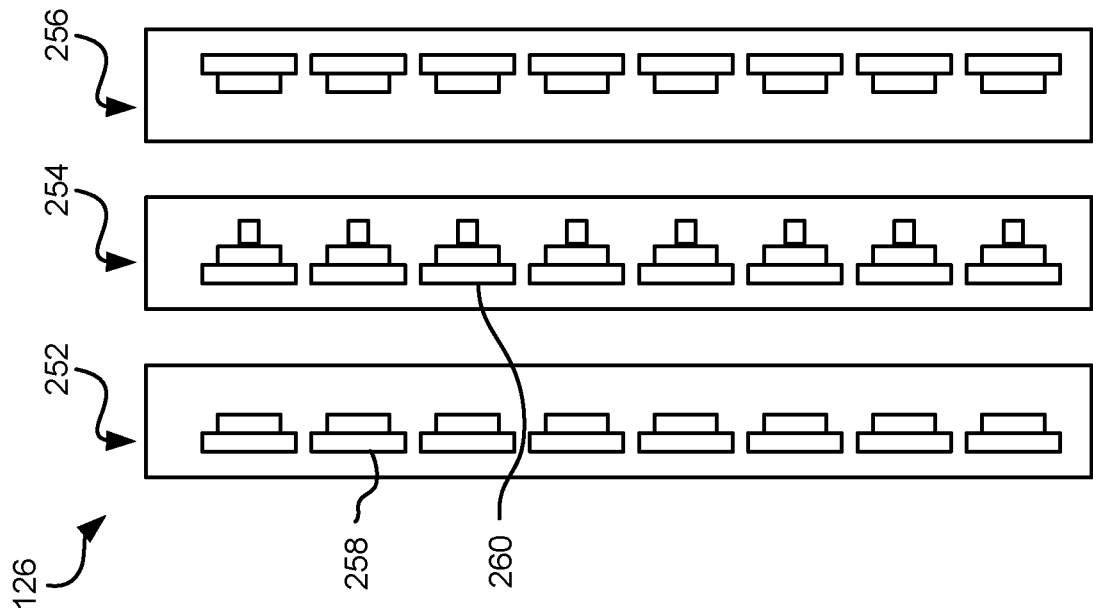
FIG. 4 is a partial tape bearing surface view of a magnetic head having a read-write-read configuration.
Figure 3:
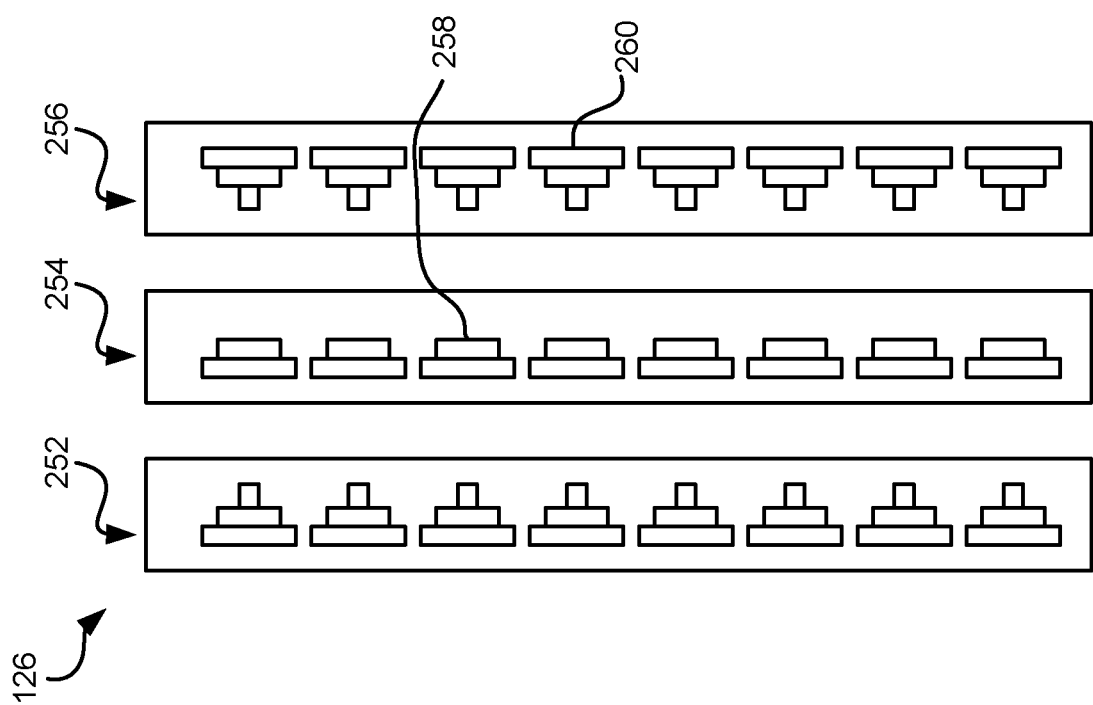
FIG. 3 is a partial tape bearing surface view of a magnetic head having a write-read-write configuration.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of write transducers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
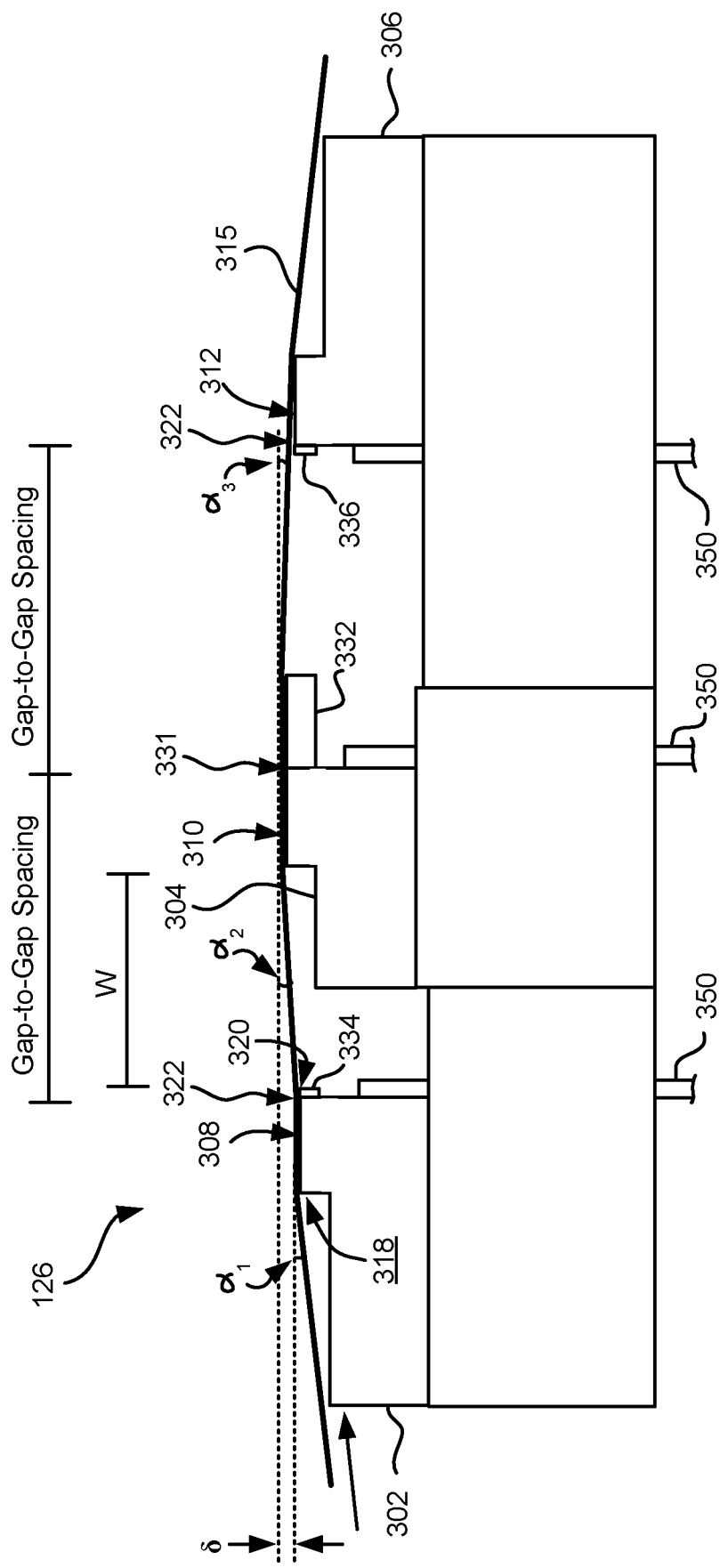
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
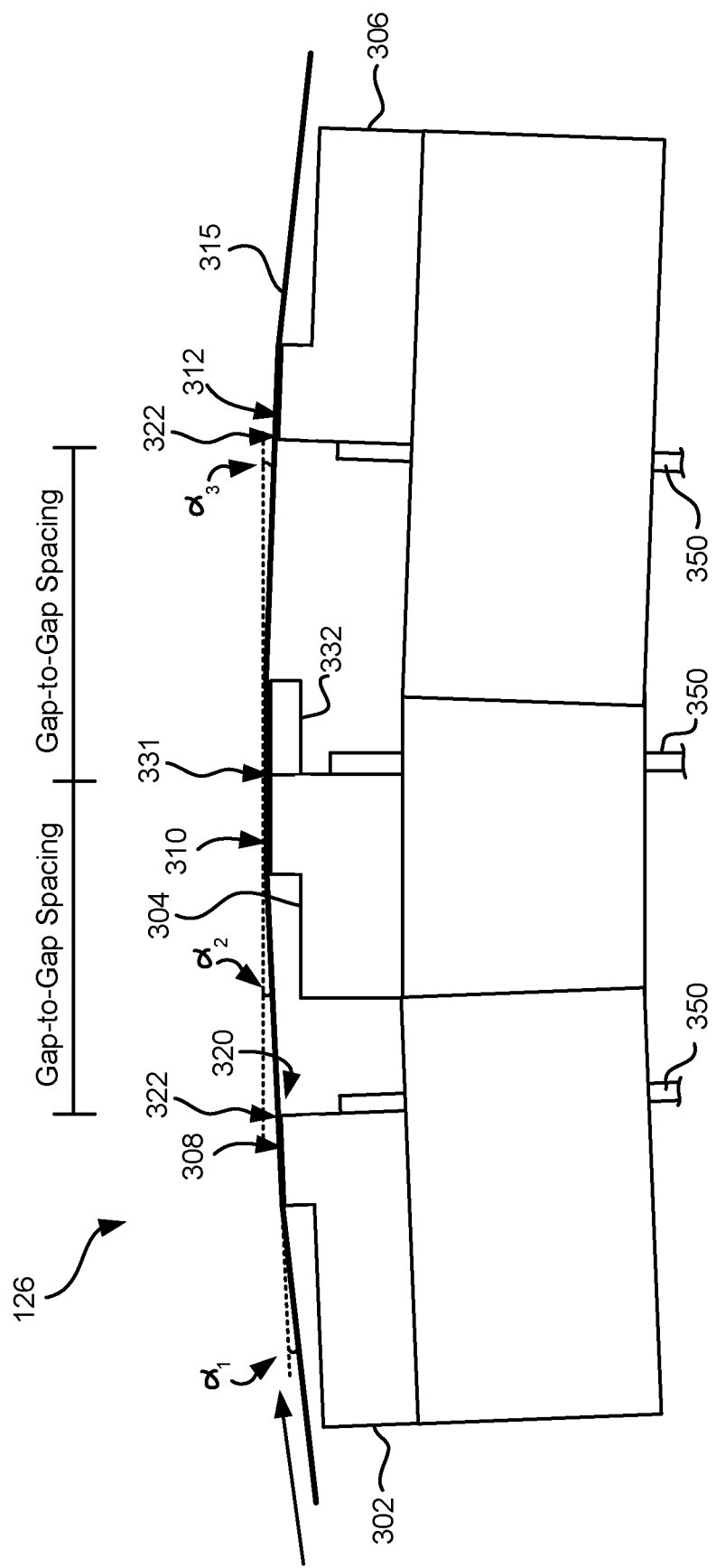
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by a skiving edge 318 of the leading module 302 has been found by experimentation to be sufficient to keep the tape adhered to the tape bearing surface 308 of the leading module 302. A trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, transducers 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no write transducers. The first and third modules 302, 306 include a plurality of write transducers 322 and no data readers, with the exception that the outer modules 302, 306 may include optional servo readers. The servo readers may be used to position the head during reading and/or writing operations. The servo reader(s) on each module are typically located towards the end of the array of readers or write transducers.

By having only readers or side by side write transducers and servo readers in the gap between the substrate and closure, the gap length can be substantially reduced. Typical heads have piggybacked readers and write transducers, where the write transducer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used linear tape open (LTO) tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
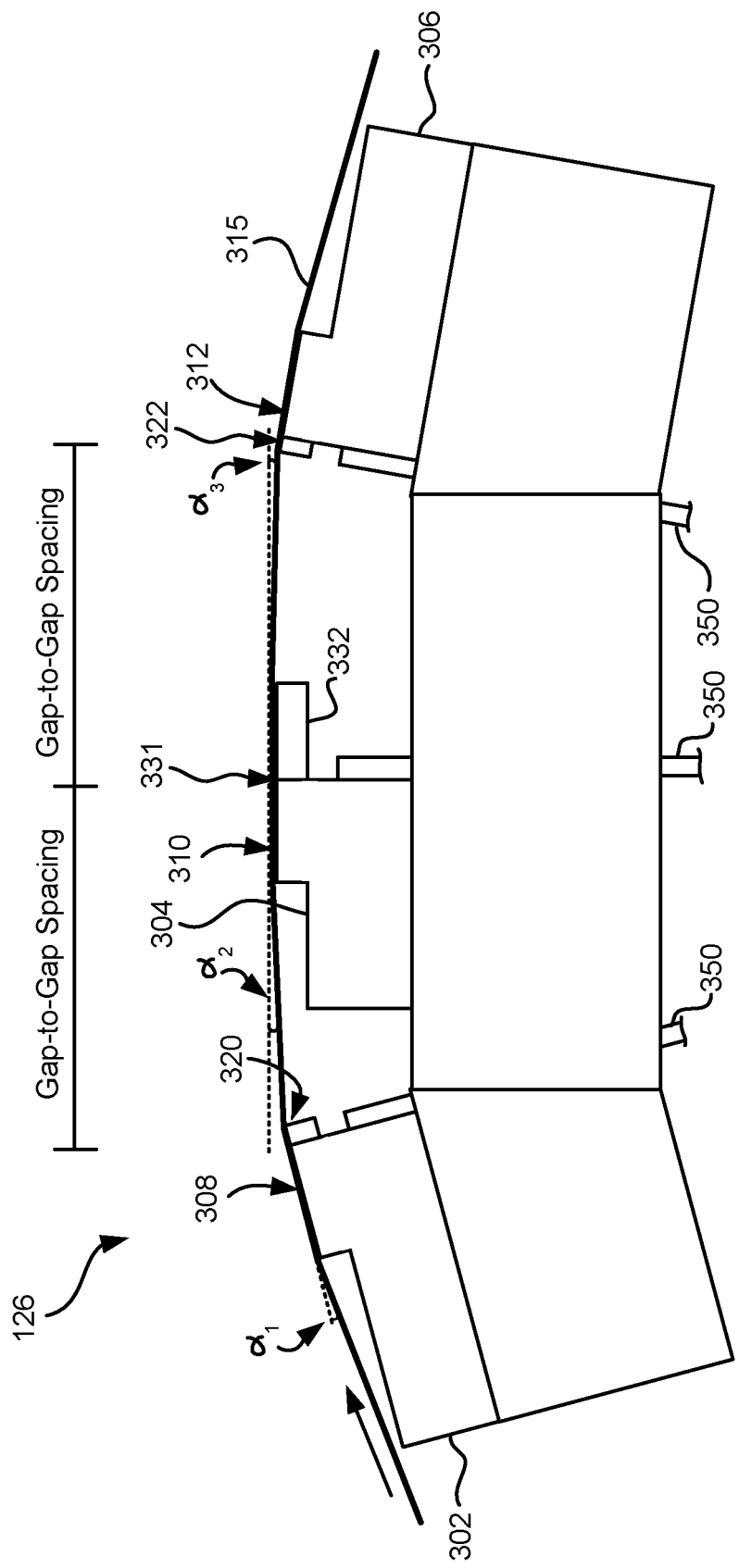
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore, a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module tape head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the write transducers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

Figure 8A:
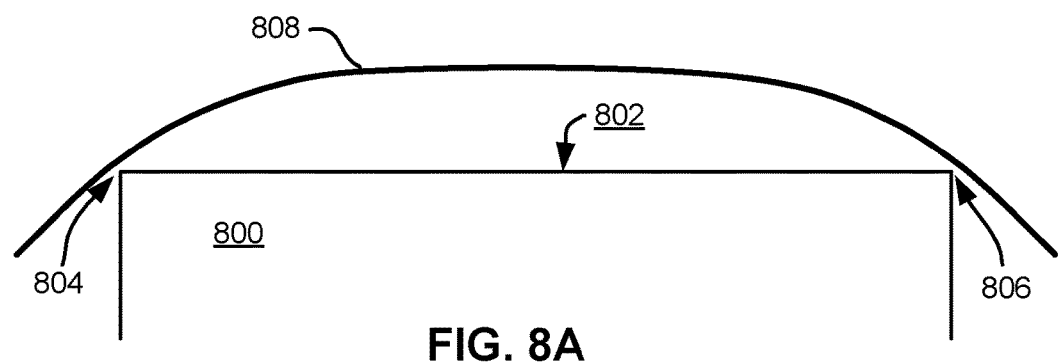
FIGS. 8A-8C are schematics depicting the principles of tape tenting.
Figure 8B:
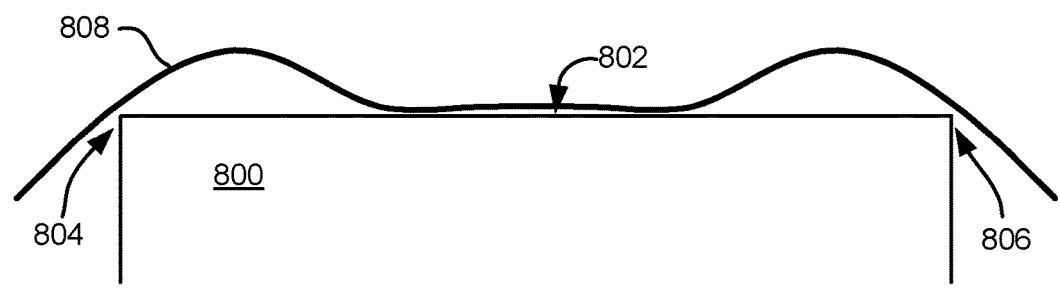
Figure 8C:
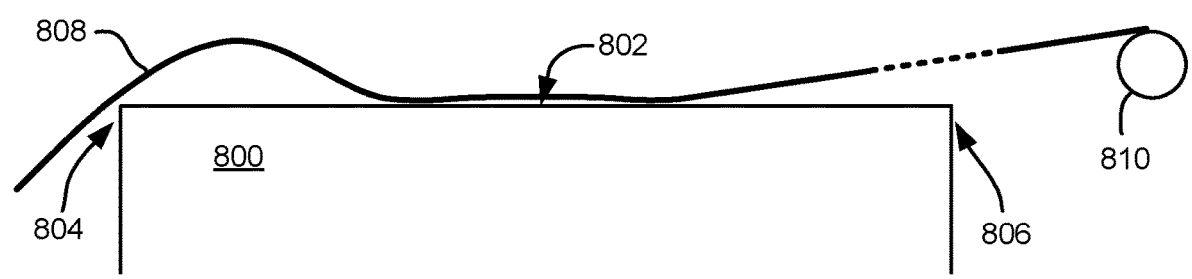

As a tape is run over a module, it is preferred that the tape passes sufficiently close to magnetic transducers on the module such that reading and/or writing is efficiently performed, e.g., with a low error rate. According to some approaches, tape tenting may be used to ensure the tape passes sufficiently close to the portion of the module having the magnetic transducers. To better understand this process, FIGS. 8A-8C illustrate the principles of tape tenting. FIG. 8A shows a module 800 having an upper tape bearing surface 802 extending between opposite edges 804, 806. A stationary tape 808 is shown wrapping around the edges 804, 806. As shown, the bending stiffness of the tape 808 lifts the tape off of the tape bearing surface 802. Tape tension tends to flatten the tape profile, as shown in FIG. 8A. Where tape tension is minimal, the curvature of the tape is more parabolic than shown.

FIG. 8B depicts the tape 808 in motion. The leading edge, i.e., the first edge the tape encounters when moving, may serve to skive air from the tape, thereby creating a subambient air pressure between the tape 808 and the tape bearing surface 802. In FIG. 8B, the leading edge is the left edge and the right edge is the trailing edge when the tape is moving left to right. As a result, atmospheric pressure above the tape urges the tape toward the tape bearing surface 802, thereby creating tape tenting proximate each of the edges. The tape bending stiffness resists the effect of the atmospheric pressure, thereby causing the tape tenting proximate both the leading and trailing edges. Modeling predicts that the two tents are very similar in shape.

FIG. 8C depicts how the subambient pressure urges the tape 808 toward the tape bearing surface 802 even when a trailing guide 810 is positioned above the plane of the tape bearing surface.

It follows that tape tenting may be used to direct the path of a tape as it passes over a module. As previously mentioned, tape tenting may be used to ensure the tape passes sufficiently close to the portion of the module having the magnetic transducers, preferably such that reading and/or writing is efficiently performed, e.g., with a low error rate.

Magnetic tapes may be stored in tape cartridges that are, in turn, stored at storage slots or the like inside a data storage library. The tape cartridges may be stored in the library such that they are accessible for physical retrieval. In addition to magnetic tapes and tape cartridges, data storage libraries may include data storage drives that store data to, and/or retrieve data from, the magnetic tapes. Moreover, tape libraries and the components included therein may implement a file system which enables access to tape and data stored on the tape.

File systems may be used to control how data is stored in, and retrieved from, memory. Thus, a file system may include the processes and data structures that an operating system uses to keep track of files in memory, e.g., the way the files are organized in memory. Linear Tape File System (LTFS) is an exemplary format of a file system that may be implemented in a given library in order to enables access to compliant tapes. It should be appreciated that various embodiments herein can be implemented with a wide range of file system formats, including for example IBM Spectrum Archive Library Edition (LTFS LE). However, to provide a context, and solely to assist the reader, some of the embodiments below may be described with reference to LTFS which is a type of file system format. This has been done by way of example only, and should not be deemed limiting on the invention defined in the claims.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge, and passing it above a magnetic head of a tape drive. Furthermore, the tape may be attached on a take-up reel (e.g., see 121 of FIG. 1A above) to move the tape over the magnetic head.

Once threaded in the tape drive, the tape in the cartridge may be "mounted" by reading metadata on a tape and bringing the tape into a state where the LTFS is able to use the tape as a constituent component of a file system. Moreover, in order to "unmount" a tape, metadata is preferably first written on the tape (e.g., as an index), after which the tape may be removed from the state where the LTFS is allowed to use the tape as a constituent component of a file system. Finally, to "unthread" the tape, the tape is unattached from the take-up reel and is physically placed back into the inside of a tape cartridge again. The cartridge may remain loaded in the tape drive even after the tape has been unthreaded, e.g., waiting for another read and/or write request. However, in other instances, the tape cartridge may be unloaded from the tape drive upon the tape being unthreaded, e.g., as described above.

Magnetic tape is a sequential access medium. Thus, new data is written to the tape by appending the data at the end of previously written data. It follows that when data is recorded in a tape having only one partition, metadata (e.g., allocation information) is continuously appended to an end of the previously written data as it frequently updates and is accordingly rewritten to tape. As a result, the rearmost information is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 9:
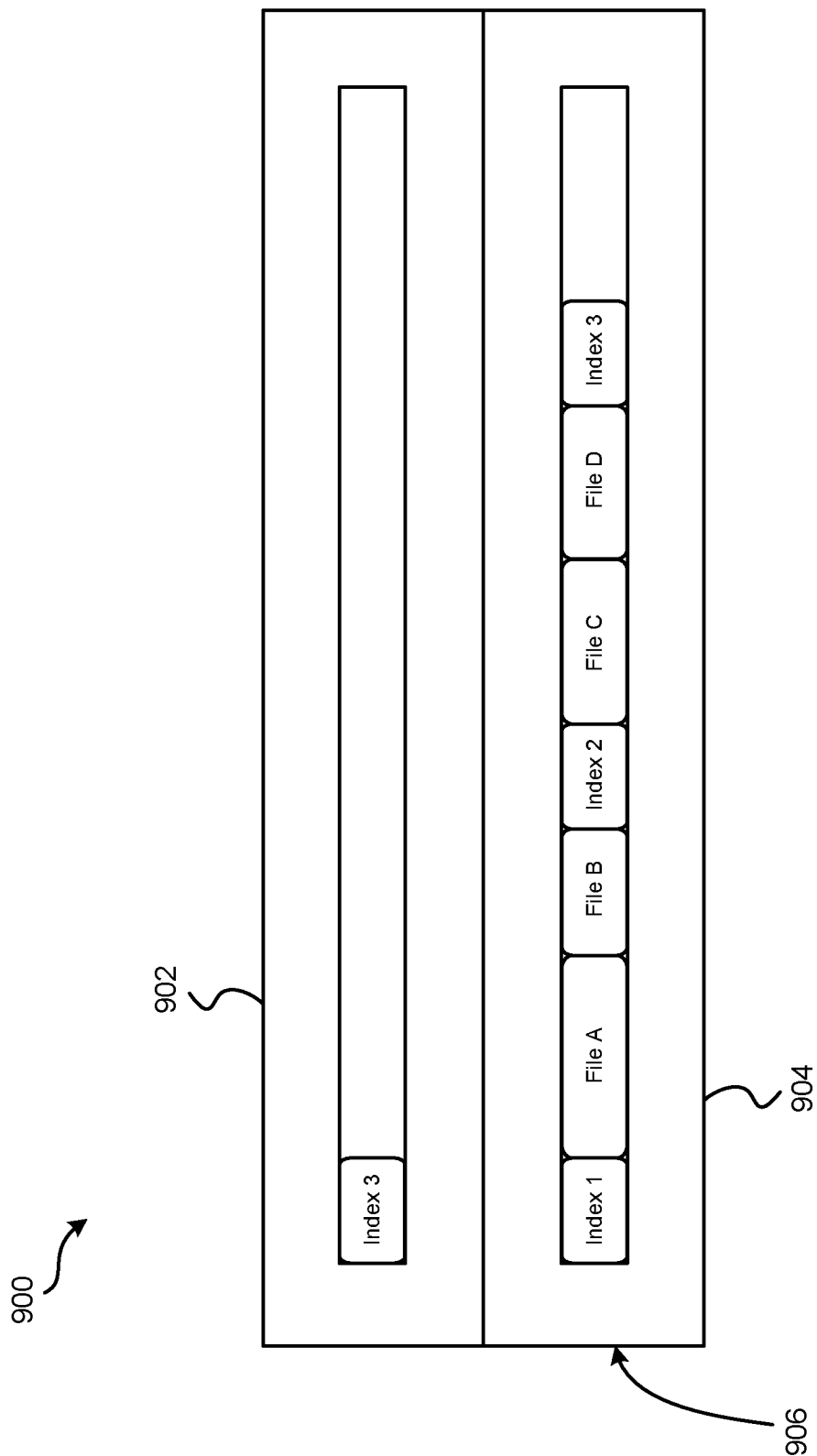
FIG. 9 is a representational diagram of files and indexes stored on a magnetic tape according to one embodiment.

Looking to FIG. 9, a magnetic tape 900 having an index partition 902 and a data partition 904 is illustrated according to one embodiment. As shown, data files and indexes are stored on the tape. The LTFS format allows for index information to be recorded in the index partition 902 at the beginning of tape 906, as would be appreciated by one skilled in the art upon reading the present description.

As index information is updated, it preferably overwrites the previous version of the index information, thereby allowing the currently updated index information to be accessible at the beginning of tape in the index partition. According to the specific example illustrated in FIG. 9, a most recent version of metadata Index 3 is recorded in the index partition 902 at the beginning of the tape 906. Conversely, all three version of metadata Index 1, Index 2, Index 3 as well as data File A, File B, File C, File D are recorded in the data partition 904 of the tape. Although Index 1 and Index 2 are old (e.g., outdated) indexes, because information is written to tape by appending it to the end of the previously written data as described above, these old indexes Index 1, Index 2 remain stored on the tape 900 in the data partition 904 without being overwritten.

The metadata may be updated in the index partition 902 and/or the data partition 904 the same or differently depending on the desired embodiment. According to some embodiments, the metadata of the index and/or data partitions 902, 904 may be updated in response to the tape being unmounted, e.g., such that the index may be read quickly from the index partition when that tape is mounted again. The metadata is preferably also written in the data partition 904 so the tape may be mounted using the metadata recorded in the data partition 904, e.g., as a backup option.

According to one example, which is no way intended to limit the invention, LTFS LE may be used to provide the functionality of writing an index in the data partition when a user explicitly instructs the system to do so, or at a time designated by a predetermined period which may be set by the user, e.g., such that data loss in the event of sudden power stoppage can be mitigated.

As noted above, a continuing goal of the data storage industry is to improve data density, such as by reducing track width. However, limitations in head manufacturing result in variation in span of tracks from head-to-head, thereby leading to limits of areal density due to the resulting misplacement of tracks during writing. Moreover, such misplacement of written tracks present future repercussions in that it affects reading such data. Thus, the variation of span between channels from head-to-head is a serious problem. For instance, even though manufactured to exacting specifications on a single wafer, head span between outermost transducers can vary from head-to-head by as much as 600 nanometers (nm) or more in current generation LTO heads that are designed for writing and reading one-half inch, four-data-band magnetic recording tapes.

Further, corrosion of high moment seed layers and of the pole tips in multichannel tape head write transducers is a common problem in conventional write transducers. Corroded portions of the pole tips and/or seed layers are not magnetic. Accordingly, corrosion changes the shape of the pole tips leading to suboptimal writing of transition, effective recession of the magnetic pole tip from the media-facing surface which results in spacing loss, etc. Corrosion of the write transducer may be so extreme as to prevent data purportedly written by such write transducer from being readable. Some materials are particularly susceptible to corrosion. For example, cobalt-iron (CoFe) materials experience high rates of corrosion.

In current multichannel tape heads, sensors or components thereof may corrode due to water adsorbed onto the magnetic recording tape onto the tape bearing surface, as for example when the temperature of the tape surface falls below the local dew point or onto the head itself. A typical solution to this problem has been to power the read transducers to raise the temperature enough to prevent accumulation of water on the tape bearing surface. While this method works well for some sensor types, e.g., AMR and GMR, its utility is limited for TMR sensors, because TMR sensors have much lower current requirements coupled with breakdown characteristics of the tunnel barrier layer may not allow heating the head enough within the sensor's safe operating voltage.

Furthermore, servo readers in writer modules and write transducers (e.g., the high magnetic moment liner components) are also susceptible to water-induced damage, yet typically have no means for generating heat either in operation or on standby.

Spacing loss due to write gap recession is another issue for multichannel tape recording heads. Recession of write gap regions is a problem that results in increased spacing loss on writing.

In a preferred embodiment, a write transducer includes a thin film device. The thin film device may enable raising the temperature of the write transducer above the dew point, thereby preventing condensation of water vapor.

Various embodiments described herein disclose a non-magnetic thin film structure proximate to, and preferably between, the writer pole tips. The thin film device addresses problems arising from corrosion, spacing loss, pitch variation in write transducers due to varying fabrication processes, etc.

FIG. 10A is a side view of a write transducer 1000 having a thin film device 1008 positioned at least in part in the write gap 1006, in accordance with one embodiment. As an option, the present write transducer 1000 may be implemented in conjunction with features from any other embodiment listed herein, such as those described with reference to the other FIGS. Of course, however, such write transducer 1000 and others presented herein may be used in various applications and/or in permutations which may or may not be specifically described in the illustrative embodiments listed herein. Further, the write transducer 1000 presented herein may be used in any desired environment.

FIG. 10B is a tape bearing surface view of the write transducer 1000 having the thin film device 1008 positioned at least in part in the write gap 1006 defined by the pole tips 1004 of the writer poles.

FIGS. 10A and 10B illustrate a write transducer 1000 comprising a pair of writer poles 1002 having pole tips 1004. Each writer pole 1002 comprises a pole tip 1004 extending from a media facing side of the writer pole, as would be understood by one having ordinary skill in the art upon reading the present disclosure. The pole tips 1004 define a write gap 1006 therebetween. The write gap 1006 positioned between the pole tips 1004 extends from a media facing surface of the write transducer 1000 in a direction perpendicular to the tape facing surface of the write transducer 1000. The dimensions of the write gap 1006 are readily determinable by one of ordinary skill in the art based on knowledge of the application, the magnetic medium, etc.

The write transducer 1000 may have writing components corresponding to any type or variety of write transducer known in the art. The write transducer 1000 may be part of an array of write transducers wherein some or all of the write transducers in the array may be equipped with any of the embodiments described herein.

The write transducer 1000 comprises a thin film device 1008 positioned at least in part in the write gap 1006. In a preferred embodiment, the thin film device 1008 extends to a media-facing side of the write gap 1006 thereby exposing the thin film device 1008. In another embodiment, the thin film device 1008 may be covered with a head coating known in the art. In yet another embodiment, as shown in FIG. 10A, the thin film device 1008 is recessed from the media-facing side of the write gap 1006. The thin film device 1008 may be recessed to minimize heating of tape media, which may cause thermal expansion of the tape media and consequently track/element misregistration. The thin film device 1008 may be constructed of any conductive material that creates joule heating upon passing a current therethrough.

Current is applied to the thin film device 1008 to cause the thin film device to generate heat. When current flows through the thin film device 1008 via electrical connections to be described in detail below, the temperature of the thin film device 1008 rises due to joule heating, which in turn raises the temperature of the write transducer 1000 in the vicinity of the thin film device 1008. Preferably, the temperature in the immediate vicinity of the write gap 1006 increases.

For a given power dissipation, the temperature rise is roughly inversely related to tape velocity and may also depend on media type, tension, age, etc. The increased temperature of and around the thin film device 1008 induces thermal expansion of the heated region. The increased temperature may be useful for minimizing the susceptibility to corrosion in a humid environment. The elevated temperature may cause localized expansion of the pole tips 1004 for decreasing head tape spacing, as would be understood by one of ordinary skill in the art in view of the teachings of the present disclosure. Furthermore, depending on the thin film device 1008 dimensions, the elevated temperatures may be used to alter the pitch between write transducers to offset deviation of pitch due to variation during fabrication processes.

In stark contrast to conventional heaters intended to reduce humidity in tape drive environments, the increased heat provided by current passing through the thin film device 1008 is preferably in intimate or near-intimate contact with regions of the writer poles 1002 which are most susceptible to corrosion. For example, high moment CoFe(Ni) liners in a write gap experience less corrosion due to the intimate or near-intimate contact with the thin film device as presented herein.

In some approaches, one or more of the pole tips acts as a lead. Conductive layers for coupling the thin film device to one or more pole tips may be fabricated in the thin films. Likewise, electrical connections 1012 may be present to connect each pole 1002 to a respective electrical pad, e.g., for coupling to a cable on an exterior of the head. One skilled in the art, once apprised of the teachings herein, would appreciate that conventional techniques and materials may be adapted for use in fabricating the thin film device, surrounding layers, leads, etc.

Referring again to FIG. 10A, in various embodiments, the write transducer 1000 includes an electrically insulating, low reluctance layer 1010 separating the writer poles 1002 in a back region thereof located away from the write gap 1006. The low reluctance layer 1010 may be any electrically insulating, low reluctance material known in the art. In various embodiments described herein, "low reluctance and insulating" refers to materials and/or layers which are magnetic but insulating and/or thin enough (if not magnetic) so as not to significantly magnetically separate the writer poles from one another in the back region. In a preferred embodiment, a non-magnetic layer is thin enough so as not to interrupt the magnetic circuit of the magnetic yoke. In one embodiment, the low reluctance layer 1010 comprises aluminum oxide ($Al_2O_3$).

Referring again to FIG. 10A, in one embodiment, the thin film device 1008 includes a tunnel barrier layer. The tunnel barrier layer may be of conventional materials used in TMR sensor designs. The thin film device 1008 preferably comprises nonmagnetic, electrically conductive layers in the write gap 1006 sandwiching the tunnel barrier layer therebetween for electrically coupling the tunnel barrier layer to the pole tips, which in turn function as electrodes for the thin film device 1008. In one embodiment, the non-magnetic tunnel barrier layer separates the upper yoke portions and a low reluctance, electrically insulating layer separates the lower yoke portions in the back region of the yoke. In this embodiment, the separated upper and lower yoke portions may connect to the leads via resistive elements. In a preferred approach, the resistive elements have a resistance within the range of about 1 ohm to about 20 ohms.

Figure 11A:
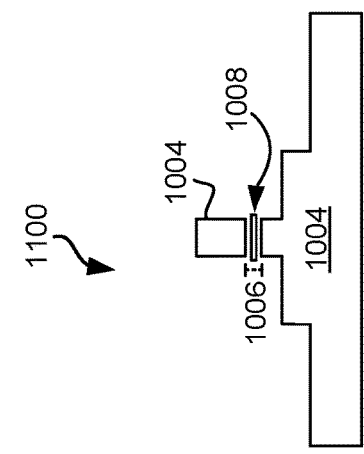
FIG. 11A is a side view of a write transducer having a thin film device positioned at least in part in the write gap, in accordance with one embodiment.
Figure 11B:
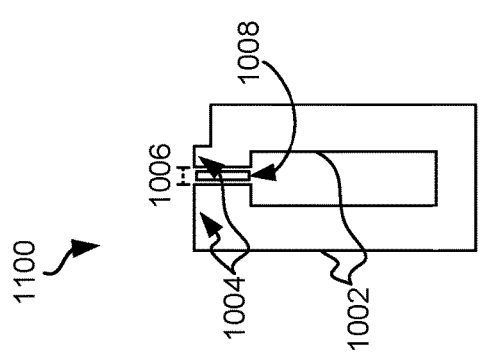
FIG. 11B is a partial tape bearing surface view of the write transducer of FIG. 11A.

FIGS. 11A-11B depict a write transducer 1100 having a thin film device 1008 positioned at least in part in the write gap 1006, in accordance with one embodiment. As an option, the present write transducer 1100 may be implemented in conjunction with features from any other embodiment listed herein, such as those described with reference to the other FIGS, especially FIGS. 10A-10B, which have common numbering of similar components. Of course, however, such write transducer 1100 and others presented herein may be used in various applications and/or in permutations which may or may not be specifically described in the illustrative embodiments listed herein. Further, the write transducer 1100 presented herein may be used in any desired environment.

In the embodiment shown in FIGS. 11A-11B, the thin film device 1008 is electrically isolated from at least one of the pole tips 1004. In one embodiment, the thin film device 1008 includes a nichrome film and one or more insulating layers in at least some approaches. The insulating layer is preferably between the nichrome film and the pole tip(s) isolated from the thin film device.

For example, an exemplary structure includes a stack comprising about 30 nm of alumina insulation above a bottom pole, about 40 nm of nichrome, and about 30 nm of alumina insulation under and in contact with a top pole. The alumina electrically isolates the thin film device residing in (e.g., partially filling) the write gap from the pole tips.

Figure 11C:
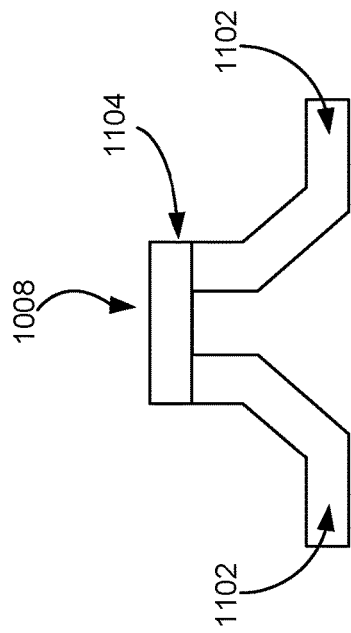
FIG. 11C is a side view of a thin film device comprising leads, in accordance with one embodiment.

In various approaches, write transducer 1100 includes electrical connections (leads) on either side of the thin film device. FIG. 11C depicts a thin film device 1008 comprising leads 1102. The leads 1102 may be any conventional type. For example, the leads may be copper, a combination of nichrome and a higher conductivity metal (e.g., copper, aluminum, etc.), etc. The relatively thinner portion between the leads has a higher resistance due to its smaller cross-sectional area, and thus produces heat when a current is passed therethrough.

Figure 11D:
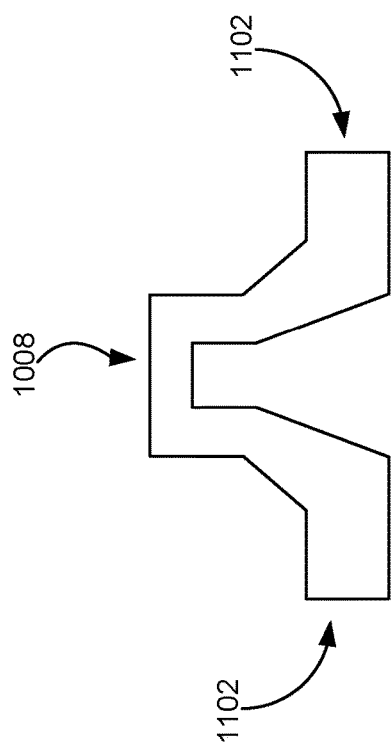
FIG. 11D is a side view of a thin film device comprising leads, in accordance with one embodiment.

FIG. 11D depicts a thin film device 1008 comprising leads 1102. As above, the leads 1102 may be any conventional type. The leads 1102 are connected to a heating portion 1104 that is primarily responsible for generating heat when current is passed therethrough via the leads 1102.

In a hybrid embodiment having features from FIGS. 10A and 11A, the thin film device 1008 has one lead 1102 connected to a heating portion. The other side of the heating portion is connected to a write pole.

Figure 12:
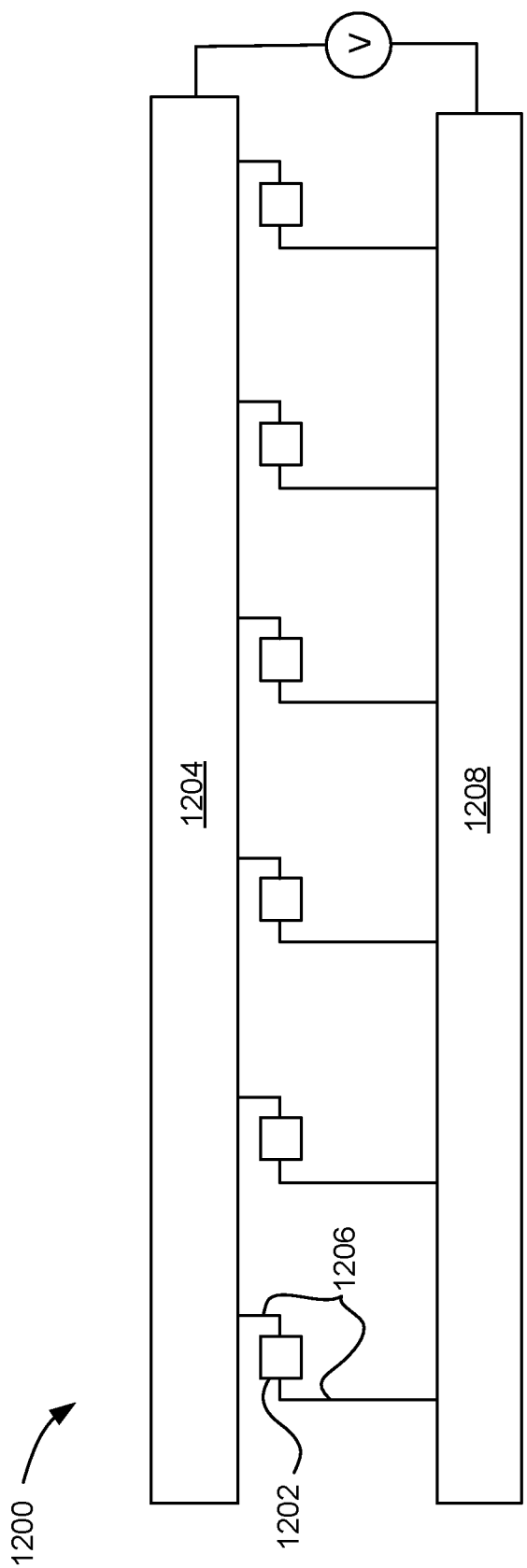
FIG. 12 is a schematic drawing of a simplified circuit of write transducers comprising thin film devices including a tunnel barrier layers, in accordance with one embodiment.

Referring briefly to FIG. 12, a simplified circuit 1200 is shown comprising write transducers having thin film devices 1202 with tunnel barrier layers, and electrical connections 1206. The upper poles of the write transducers are connected to a first common lead 1204 through the upper electrical connections 1206 and lower poles of the write transducers are connected to a second common lead 1208 through the lower electrical connections 1206. In various approaches, a writer bus for tape drive products may be used.

In one embodiment, the thin film device 1202 including the tunnel barrier layer may be trimmed during pole tip trimming where the tunnel barrier layer does not comprise additional lead structures. In a preferred approach, the write gap comprises an under layer of iridium, nichrome, etc., a tunnel barrier of alumina (e.g., aluminum oxide ($Al_2O_3$), magnesium oxide (MgO), etc.), and capping layers of ruthenium, tantalum, etc.

In one embodiment, the low voltage (e.g., ground) side of the thin film devices may connect to an existing bus in the write transducer module. The bus may be connected to ground, another current sink externally, etc. In one approach, the positive ends of the thin film devices may be connected to an upper bus, which, in turn, may be connected to a supply voltage. In some embodiments, the supply voltage is programmed either in the product microcode; externally associated with any of: a head temperature, humidity, tape velocity, etc.; etc.

In various approaches, the thin film devices may be connected in parallel, as shown. It should be understood by one of ordinary skill in the art upon reading the present disclosure that other topologies are possible (e.g., series connections, a combination of series and parallel connections, etc.).

Referring again to FIGS. 10A-10C, in some approaches, an electrical resistance of a thin film device 1008 may be in a range of about 10 ohms to about 100 ohms. A resistance may be selectable by one having ordinary skill in the art upon reading the present disclosure in view of known ranges of resistances which are favorable for integrating with existing electronics and/or adaptable for use with future electronics.

In preferred embodiments, an apparatus comprising the write transducer 1000 includes electrical connections for causing a current to pass through the thin film device 1008. Any type of conventional electrical connection may be used, such as conductive layers, vias, etc. that are typically found in conventional magnetic head fabrication. The electrical connections for causing a current to pass through the thin film device 1008 may include a lead electrically coupled to at least one of the pole tips 1004. In another embodiment, the electrical connections for causing a current to pass through the thin film device 1008 are not electrically coupled to the pole tips 1004. For example, the thin film device may be sandwiched between two insulating layers.

An apparatus comprising the write transducer 1000 may also include a drive mechanism for passing a magnetic medium over the write transducer. The drive mechanism may be any drive mechanism known in the art.

An apparatus comprising the write transducer 1000 may also include a controller which is electrically coupled to the write transducer 1000 and the electrical connections. See, e.g., FIG. 1A. In various embodiments described herein, the apparatus includes a controller electrically coupled to the thin film device, where the controller is configured to control a power level (e.g., current) applied to the thin film device for controlling an extent of thermal expansion based on a current state of expansion of a magnetic recording tape moving over the write gap.

In another exemplary structure, the thin film device has lateral dimensions similar to the pole tip widths and heights (e.g., throat height). Dimensions of the device may be about 1 nm to about 3 nm wide and about 1 nm to about 3 nm tall. In other embodiments, the dimensions may be greater or smaller in either dimension as would be understood by one having ordinary skill in the art. The insulating layers may be thinner or thicker for adapting to write gaps of various dimensions. The resistive layer may be in a range of about 5 nm to about 50 nm. The resistive layer may be any suitable metal and/or electrical conductor as would be understood by one having ordinary skill in the art upon reading the present disclosure.

The rise in temperature and thus the change in span of transducers is a function of several factors, including power dissipation in the resistive element, design of the resistive element, the precise location of the resistive element in the head module, tape velocity, head lands design, heat dissipation in the module, etc., the effect of each of which may be determined via modeling. Moreover, a magnetic recording tape moving over a head module effectively removes heat generated by the heating element. Generally, lower speeds of a moving magnetic recording tape results in higher temperature rise for a given heater power compared to a lower temperature rise at higher speeds of the moving magnetic recording tape. The moving magnetic recording tape may also become heated thereby resulting in tape expansion. Tape expansion due to increased heat may create issues of its own. Typically, however, the extent of tape expansion in response to the increased temperature in the write gap is minimal. Moreover, tape expansion due to heating may also be a function of tape speed, for a given power of heat generated by the resistive element.

Figure 13:
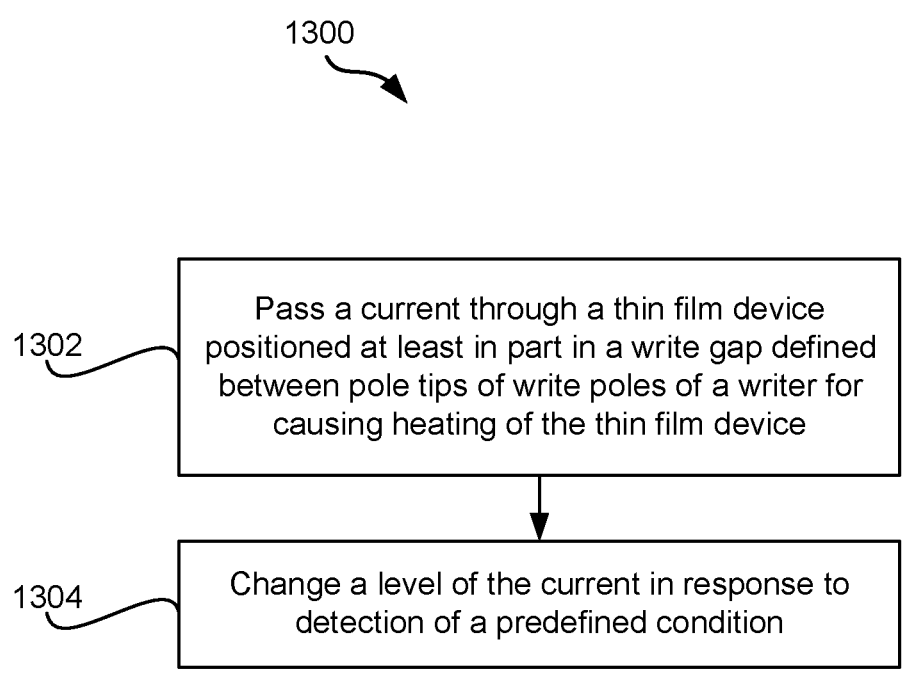
FIG. 13 is a flowchart of a method, in accordance with one embodiment.

Now referring to FIG. 13, a flowchart of a method 1300 is shown according to one embodiment. The method 1300 may be performed in accordance with the present invention in any of the environments depicted in FIGS. 1-12, among others, in various embodiments. Of course, more or less operations than those specifically described in FIG. 13 may be included in method 1300, as would be understood by one of ordinary skill in the art upon reading the present descriptions.

Each of the steps of the method 1300 may be performed by any suitable component of the operating environment. For example, in various embodiments, the method 1300 may be partially or entirely performed by computers, or some other device having one or more processors therein. The processor, e.g., processing circuit(s), chip(s), and/or module(s) implemented in hardware and/or software, and preferably having at least one hardware component may be utilized in any device to perform one or more steps of the method 1300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 13, method 1300 includes operation 1302 comprising passing a current through a thin film device positioned at least in part in a write gap defined between pole tips of writer poles of a write transducer for causing heating of the thin film device. The thin film device may include any or all of the embodiments disclosed in detail above. For example, the thin film device may include a tunnel barrier layer comprising convention materials used in TMR sensor designs as described above. Similarly, the write transducer may be configured in a similar manner any write transducer known in the art and/or any writer described in detail above, save for the new thin film device and corresponding electrical connections.

In one embodiment, an array of the write transducers is present on a single module. Each write transducer preferably comprises one of the thin film devices positioned in the write gap thereof. In some embodiments, the method 1300 includes independently controlling the level of current passing through each of the thin film devices individually. In other embodiments, the method 1300 includes controlling the level of current passing through each of the thin film devices collectively.

Operation 1304 includes changing a level of the current in response to detection of a predefined condition. The predefined condition may be predefined by a user, a manufacturer, a default setting, a service operator, etc. Any value associated with any predefined condition disclosed herein may be found in look up table. In various embodiments, an electrical connection for passing the current through the thin film device includes a lead electrically coupled to at least one of the pole tips as described in detail above with reference to FIGS. 10A-12. In another embodiment, an electrical connection for passing the current through the thin film device is not electrically coupled to the pole tips as described in detail above with reference to FIGS. 10A-12. In some approaches, the thin film device is sandwiched between two insulating layers, and powered by leads. The insulating layers may comprise alumina or any insulating material disclosed herein.

In one embodiment, the predefined condition is a change in tape speed across the thin film device. Heat carried away from a tape head may be a function of the speed of magnetic medium passing over a tape head. For example, the faster the speed of magnetic medium passing over the tape head, the lower the temperature in the immediate vicinity of the tape head for a given power due to the tape carrying heat away from head.

In various approaches, a voltage (V*) is associated with a tape velocity. Specifically, higher velocity requires higher V*. For example, V*=0.4 v→4 mW and the total current is equal to 10×32=320 ma.

In another embodiment, the predefined condition is a change in an environmental condition selected from the group consisting of temperature and humidity. The temperature and/or humidity may be the temperature and/or humidity in the drive, in the tape library, in the immediate vicinity of the tape head, the drive, the write, the tape library, etc., etc. The temperature and/or humidity may be measured via any sensor known in the art.

Magnetic media moving over a head module effectively removes heat generated by the thin film device. In some embodiments, the speed of the moving magnetic medium may be adjusted by the controller to alter head span. Generally, lower speeds of a moving magnetic medium results in higher temperature rise for a given heater power compared to a lower temperature rise at higher speeds of the moving magnetic medium. The moving magnetic medium may also become heated thereby resulting in tape expansion. The tape speed may be adjusted in some embodiments to control the amount of heat absorbed by the tape, thereby providing a level of control over the degree of registration between module and tape.

In yet another embodiment, the predefined condition corresponds to an amount of recession of the write gap. Additional heat provided by passing a current through a thin film device positioned at least in part in a write gap may be used to cause local expansion of the pole tips for decreasing head-tape spacing and/or altering the pitch between write transducers to offset deviation of the pitch due to fabrication processes.

In one embodiment, the predefined condition corresponds to a change in servo signal timing. Servo signals are used to keep readers and/or write transducers aligned with a particular set of tracks during read/write operations. A change in servo signal timing may correlate to change in tape speed across the thin film device.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. An apparatus, comprising:
an array of write transducers for writing to a magnetic recording tape, each write transducer having a pair of writer poles having pole tips, the pole tips defining a write gap therebetween;
a thin film device positioned at least in part in each write gap for raising a local temperature of the write gap;
electrical connections for causing a current to pass through the thin film devices; and a controller electrically coupled to the thin film devices, where the controller is configured to control a power level applied to the thin film devices,
wherein the controller is configured to control the power level applied to the thin film devices based on a current state of expansion of a magnetic recording tape moving over the write gap.

2. The apparatus as recited in claim 1, wherein each thin film device extends to a media-facing side of the write gap.

3. The apparatus as recited in claim 1, wherein each thin film device includes a tunnel barrier layer positioned at least in part in the write gap.

4. The apparatus as recited in claim 3, comprising nonmagnetic, electrically conductive layers in each write gap sandwiching the tunnel barrier layer therebetween for electrically coupling the tunnel barrier layer to the associated pole tips.

5. The apparatus as recited in claim 3, wherein each tunnel barrier layer extends to a media-facing side of the associated write gap.

6. The apparatus as recited in claim 3, wherein each tunnel barrier layer is at least as wide as the associated write gap.

7. The apparatus as recited in claim 1, wherein the electrical connections for causing a current to pass through each thin film device includes a lead electrically coupled to at least one of the pole tips.

8. The apparatus as recited in claim 7, comprising an electrically insulating, low reluctance layer separating the writer poles in a back region thereof located away from the associated write gap.

9. The apparatus as recited in claim 1, wherein each thin film device is electrically isolated from at least one of the associated pole tips.

10. The apparatus as recited in claim 9, wherein each thin film device includes a nichrome film and an insulating layer.

11. The apparatus as recited in claim 1, wherein the electrical connections for causing a current to pass through the thin film devices are not electrically coupled to the pole tips.

12. The apparatus as recited in claim 1, further comprising:
a drive mechanism for passing the magnetic recording tape over the array of write transducers.

13. The apparatus as recited in claim 1, wherein each thin film device is recessed from a media-facing side of the write gap for minimizing heating of tape media.

14. The apparatus as recited in claim 1, wherein an electrical resistance of each thin film device is in a range of about 10 ohms to about 100 ohms.

15. The apparatus as recited in claim 1, wherein the electrical connections are electrically coupled to a common lead for electrically coupling the common lead to one of the writer poles of each of the write transducers.

16. An apparatus, comprising:
an array of write transducers for writing to a magnetic recording tape, each write transducer having a pair of writer poles having pole tips, the pole tips defining a write gap therebetween;
a thin film device positioned at least in part in each write gap for raising a local temperature of the write gap;
electrical connections for causing a current to pass through the thin film devices, wherein each thin film device includes a tunnel barrier layer positioned at least in part in the write gap; and
a conductive under layer and a conductive capping layer in each write gap for electrically coupling the tunnel barrier layer to the associated writer poles, wherein each tunnel barrier layer does not comprise additional lead structures in the associated write gap.

17. An apparatus, comprising:
an array of write transducers for writing to a magnetic recording tape, each write transducer having a pair of writer poles having pole tips, the pole tips defining a write gap therebetween;
a thin film device positioned at least in part in each write gap for raising a local temperature of the write gap;
electrical connections for causing a current to pass through the thin film devices; and
a controller electrically coupled to the thin film devices, where the controller is configured to control a power level applied to the thin film devices,
wherein the controller is configured to adjust a speed of a magnetic recording tape moving over the write gaps for controlling an amount of heat absorbed by the tape.

* * * * *